United States Patent
Lericque et al.

(10) Patent No.: US 6,342,271 B1
(45) Date of Patent: Jan. 29, 2002

(54) PHENOLIC RESIN FOR GLUE SIZING COMPOSITION, PREPARATION METHOD AND GLUE SIZING COMPOSITION CONTAINING SAME

(75) Inventors: Bernard Lericque, Rantigny; Serge Tetart, Saint-Maximin; Claire Labbe, Creil; Philippe Espiard, Gouvieux, all of (FR)

(73) Assignee: Isover Saint-Gobain, Courbevoie (FR)

( * ) Notice: Subject to any disclaimer, the term of this patent is extended or adjusted under 35 U.S.C. 154(b) by 0 days.

(21) Appl. No.: 09/462,459
(22) PCT Filed: Jul. 9, 1998
(86) PCT No.: PCT/FR98/01484
  § 371 Date: Apr. 27, 2000
  § 102(e) Date: Apr. 27, 2000
(87) PCT Pub. No.: WO99/03906
  PCT Pub. Date: Jan. 28, 1999

(30) Foreign Application Priority Data

Jul. 15, 1997 (FR) .............................. 98 08936

(51) Int. Cl.⁷ ............................. B05D 3/02; C08G 14/04
(52) U.S. Cl. ................. 427/385.5; 427/389.7; 427/289.8; 427/421; 528/230; 528/240; 528/242
(58) Field of Search ............................. 427/421, 385.5, 427/372.2, 389.7, 389.8; 528/230, 240, 242

(56) References Cited

U.S. PATENT DOCUMENTS

| | | | | |
|---|---|---|---|---|
| 4,710,406 A | * | 12/1987 | Fugier et al. | ............ 427/389.8 |
| 5,270,434 A | * | 12/1993 | Tetart et al. | ................ 528/164 |
| 5,371,140 A | * | 12/1994 | Parks | ....................... 525/54.42 |

* cited by examiner

*Primary Examiner*—Shrive P. Beck
*Assistant Examiner*—Jennifer Calcagni
(74) *Attorney, Agent, or Firm*—Oblon, Spivak, McClelland, Maier & Neustadt, P.C.

(57) ABSTRACT

The invention relates to a resin composition based on a urea-modified phenol-formaldehyde resole which has a formaldehyde/phenol molar ratio of 2 to 5, exhibiting a free formaldehyde content lower than or equal to 3 percent (by weight relative to the total weight of the composition), a free phenol content lower than or equal to 0.5 percent and a dilutability measured at 20° C., of at least 1000 percent and to a process for the preparation of this composition. This composition is characterized in that it contains an overcondensed resole obtained by the condensation of phenol, of formaldehyde, and optionally of urea in basic medium, until the product has a water dilutability at pH 9 that is lower than or equal to 2000 percent, or the product of neutralization of such as resole. The modification of an overcondensed phenolic resole by neutralization with boric acid according to the invention permits the dilutability of the resole to be increased. An application is for sizing composition s for products based on mineral wool with a reduction in atmospheric pollution upon use.

55 Claims, No Drawings

PHENOLIC RESIN FOR GLUE SIZING COMPOSITION, PREPARATION METHOD AND GLUE SIZING COMPOSITION CONTAINING SAME

BACKGROUND OF THE INVENTION

The present invention relates to a phenolic resin intended especially to be employed in a sizing composition for material based on mineral wool, especially insulating products in felt or sheet form.

The manufacture of mineral wool-based products includes a first stage of manufacture of the wool itself, especially by the known technique of centrifugal drawing in which the molten mineral material is converted into filaments, and a stage of forming in which the filaments are drawn and entrained towards a receiving member by a gas stream at a high speed and temperature, to form a mat thereon. To ensure the cohesion of the mat, a so-called sizing composition, which contains a heat-curable resin is sprayed onto the wool during its travel towards the receiving member. The mat thus treated is next subjected to an oven heat treatment to polycondense (cure) the resin and obtain a product exhibiting desired properties, such as dimensional stability, tensile strength, thickness regain after compression and homogeneous colour.

The sizing compositions are generally sprayed onto the mineral wool and are prepared in the form of an aqueous composition (solution, dispersion). This composition is in general prepared shortly before spraying, on the actual production site, by addition of the usual constituents: a curing catalyst such as ammonium sulphate, urea and possible adjuvants such as lubricating mineral oils as antidust agent, aqueous ammonia, silanes as adhesiveness promoter and silicone as water-repellent.

The sprayability of such compositions is determined by the dilutability of the resin in water, which is generally defined as follows: the water-dilutability of a resin in the form of aqueous composition (resole) is the volume of deionized water which, at a given temperature, can be added to the unit volume of this composition before causing the formation of a permanent turbidity. The water dilutability of a resin suitable for being employed in a sprayable sizing composition is advantageously of the order of at least 1000% at 20° C., that is to say that 10 ml of resin can be diluted with 10×10 ml of water or more, without the mixture becoming turbid.

It is furthermore desirable that the resin should be stable in storage to allow use at the last moment: the dilutability must therefore remain high for as long a period as possible. A resin will advantageously have a water dilutability at 20° C. equal to or higher than 1000% for at least 8 days.

The heat-curable resin employed is generally a phenolic resole obtained by condensation of phenol and of formaldehyde, or equivalents, in the presence of a basic catalyst. To satisfy the requirement of a high water dilutability the degree of condensation of the monomers is limited, to avoid the formation of long, not very hydrophilic, molecular chains, which reduce the dilutability.

In this respect it is customary to terminate the condensation reaction at a degree of progress when the molecular chains are not very long, by neutralizing the reaction mixture to a pH of the order of 7 to 8 with a strong acid such as sulphuric acid, which has the effect of deactivating the basic catalysis. The resole then contains a certain proportion of starting materials, phenol and formaldehyde, which have not reacted.

Furthermore, to limit the risks of atmospheric pollution during the processing of the sizing composition, it is desirable that the composition employed should be as free as possible from volatile organic compounds such as the unconverted starting materials, free phenol and formaldehyde, or from other materials capable of being formed during the condensation of the monomers, and that it should generate as few polluting by-products as possible during the spraying onto the filaments at elevated temperature and/or when passing in the oven. The content of monomers, in particular free phenol and, above all, volatile phenolic derivatives, could in theory be reduced by increasing the duration and the degree of condensation of the resins, but there would then be a loss in the dilutability of the resin.

The problem which underlies the invention consists in satisfying as well as possible these two contradictory requirements.

To reduce the free phenol content in the resin it is generally proposed to prepare the phenolic resole by reacting phenol with formaldehyde in a form aldehyde/phenol molar ratio higher than 1, which promotes the consumption of the phenol, and then to add urea, which reacts with excess formaldehyde. Resins formed of formaldehyde/phenol and urea/formaldehyde condensates are thus obtained. The resin may be neutralized before or after the addition of urea, which has the additional effect of shifting the equilibrium of the reversible reaction between urea and formaldehyde towards the formation of the condensation product. It is generally preferred to neutralize the resin at a pH close to 7 to avoid the release of polluting starting materials.

Document EP-A-0 148 050 describes the preparation by this technique of resins which have a water dilutability of at least 1000% and which have a free phenol content (by weight relative to the total weight of liquid resin) lower than or equal to 0.5%, and a free formaldehyde content (by weight relative to the total weight of liquid resin) lower than or equal to 3%.

In the ideal case all the urea ought to be added to the resole at the time of the manufacture of the resin to simplify the preparation of the sizing composition on site. However, the modification of the resole by the urea can result in a partial precuring of the sizing and in difficulties in handling downstream. This is why the resole, which still contains a certain proportion of formaldehyde is modified only partially, and urea is added again to the sizing composition. These sizing compositions must nevertheless be employed fairly quickly because their storage period is relatively limited.

EP-A-0 512 908 provides a means for reducing the precuring and increasing the storage period before use of a sizing prepared from a modified resole of this type. It consists in reacting the neutralized resole with two nitrogenous reactors, namely aqueous ammonia and urea.

Other modifications of the resins, aimed at improving other properties of the sizing, are also known from the prior art.

Thus, U.S. Pat. No. 4,176,105 concerns the preparation of a binder for mineral fibres, based on a phenolic resol of improved heat resistance, capable of with-standing a heat curing operation without undergoing flameless exothermic decomposition (also known as "punking") which is usually responsible for colour defects in mineral wool-based products. It proposes to prepare a modified phenolic prepolymer of low molecular weight in three stages consisting in combining a phenol-formaldehyde condensate of low molecular weight, consisting essentially of polyhydroxymethylphenols, with a water-soluble boron compound such as boric acid as far as an acidic pH of the order of 2, and then adjusting the pH of the mixture to a value of the order of 7 to 9 with a base such as ammonium hydroxide and, finally, adding a difunctional nitrogen compound such as urea.

U.S. Pat. No. 5,032,431 discloses the use of a water-soluble borate for improving the moisture resistance of phenolic resin-based compositions cured in alkaline medium, employed in the manufacture of glass fibre-based dark-coloured insulating materials. The borate, such as lithium, sodium or potassium metaborate, can be simply added to the alkaline phenolic resol of pH higher than 8.5 or else can be manufactured in situ by reaction of boric acid with the appropriate alkali metal hydroxide in a sufficient quantity for the pH of the composition to remain higher than 8.5.

SUMMARY OF THE INVENTION

While the resins and sizing compositions prepared in the way set out above offer quite a satisfactory compromise between the free phenol and formaldehyde content and the dilutability, it is always desirable to improve this performance. The aim of the invention is to provide a resin for sizing composition which has a very low content of polluting volatile organic compounds, not only phenol and formaldehyde, but also volatile organic derivatives such as monomethylolphenols, which is dilutable and preferably stable in storage for a period at least equal to that of the resins known at present, and which is in addition easy to prepare.

DETAILED DESCRIPTION OF THE PREFERRED EMBODIMENTS

The present invention is based on the unexpected discovery that it is possible to prepare a dilutable and stable resin composition from a highly condensed phenolic resole, whose dilutability in basic medium may be relatively low, and that precipitates in general in sulphuric acid medium. The invention consequently makes it possible to prepare phenolic resins which are not highly polluting by the route consisting in pushing the condensation reaction towards products of high molecular weight, while solving the problem of processing the resin on the manufacture site.

In this respect, the first subject-matter of the invention is a resin composition based on a urea-modified phenol-formaldehyde resole which has a formaldehyde/phenol molar ratio of the order of 2 to 5, exhibiting a free formaldehyde content lower than or equal to 3% (by weight relative to the total weight of the composition), a free phenol content lower than or equal to 0.5% and a dilutability measured at 20° C. of at least 1000%, characterized in that it contains an overcondensed resole obtained by condensation of phenol, of formaldehyde and optionally of urea in basic medium until the product has a water dilutability at pH 9 lower than or equal to 2000%, or the product of neutralization of such a resole.

The invention enables to provide stable resin compositions, having a dilutability measured at 20° C. of at least 1000% for at least 3 weeks' storage at 12° C., even where they comprise the product of neutralization of the overcondensed resole.

In the present invention, the phenol-formaldehyde resole may be modified with urea in the known manner, by reaction with heating, especially as described in EP-A-0 148 050, or cold, after an optional period of rest at the ambient temperature of the product of phenol-formaldehyde condensation.

In the present description the term "overcondensed resole" denotes a resole characterized, at the end of the condensation stage of phenol, formaldehyde and optionally urea, by a relatively high proportion of large oligomers containing at least three intercondensed nuclei, and by a high average molecular weight, for example, but without any limitation being implied, higher than or equal to 500. This resole is obtained by increasing the period and/or the temperature of reaction relative to the conventional resins, and hence the degree of condensation, so as to ensure a virtually quantitative conversion of the initial phenol while going beyond the stage of the monocondensation to monomethylolphenols. It therefore contains a very low proportion of free phenol and volatile phenolic compounds capable of polluting the atmosphere at the site of use.

The high proportion of relatively water-repellent species of high molecular weight in the resole is reflected in a relatively low dilutability of the resin.

The overcondensed nature of the resoles which can be employed according to the invention is expressed by the dilutability of the basic mixture (at pH approximately 9) at the end of reaction between phenol, formaldehyde and optionally urea, which is lower than or equal to 2000%, in the case of a reaction mixture 5 whose solids content is especially of the order of 40 to 60% by weight.

The invention advantageously employs very highly condensed resoles of dilutability lower than or equal to 1500%, or else to 1000%, especially of the order of 400 to 900%.

The invention advantageously makes it possible to reach a free phenol content lower than or equal to 0.2%, and even of 0.1% or less.

In general, an overcondensed resole has a very low dilutability, particularly lower than 500%, or even nil, when it is neutralized with sulphuric acid. A precipitation can be observed as soon as the pH reaches a value of the order of 8 to 8.5.

It may nevertheless be desirable to employ the resole in neutralized form in the resin composition, in particular to prevent the urea-formaldehyde condensates from releasing the free monomers.

In a first alternative form the invention proposes to neutralize the resole with boric acid or an equivalent borate, such as ammonium borate, sodium metaborate, sodium tetraborate, aminoalcohol polyborates . . . This is because it has been discovered by the inventors that, surprisingly, the boric acid employed as neutralizing agent for an overcondensed phenolic resol modifies the resole in such a way that its dilutability is higher in the neutralized medium thus obtained than in the medium obtained with sulphuric acid. The product of neutralization of such a resole with boric acid has in general a dilutability at 20° C. of at least 1000%, very often of the order of 2000% or more.

Without wishing to be bound by any scientific theory whatsoever, it is assumed that with the phenol-formaldehyde condensates boric acid forms polar borate complexes which impart a strong hydrophilic character to the molecular chains, promoting the solubility in aqueous medium.

In a preferred embodiment the resin composition based on a resole neutralized with boric acid is substantially neutral, with a pH of the order of 7 to 8.

However, it may also be basic, for example with a pH of the order of 8 to 10, especially from 8.5 to 10, when the neutralization of the resole is performed with boric acid in alkaline, especially ammoniacal, solution. Surprisingly, it has been found that the highly condensed resole modified with boric acid is stable in basic medium.

Regardless of their pH, all these compositions containing a product of neutralization with boric acid have a water dilutability at 20° C. higher than or equal to 1000% for at least 3 weeks' storage at 12° C.

In a second alternative form the invention proposes to neutralize the resole with sulphamic acid or an equivalent sulphamate. This is because it has also been discovered by the inventors that, surprisingly, the sulphamic acid employed as neutralizing agent for an overcondensed phenolic resol modifies the resole in such a way that its dilutability is higher in the neutralized medium thus obtained than in the medium obtained with sulphuric acid. The product of neutralization of such a resole with sulphamic acid has in general a dilutability at 20° C. of at least 1000%, very often of the order of 2000% or more.

The resin composition based on a resole neutralized with sulphamic acid is in general substantially neutral, with a pH of the order of 7 to 8.

It has a dilutability at 20° C. of at least 1000% for at least 3 weeks' storage at 12° C.

In another alternative form the resin composition contains a product of neutralization with any acid, but also contains an emulsifier such as a gum and/or an anionic surfactant, especially guar and ghatti gums, or optionally caseine.

Preferably, where a common strong acid is used, the product of neutralization of the resole is obtained in the presence of the emulsifier.

The acid employed may be chosen from any strong acids which are known per se, such as sulphuric acid, hydrochloric acid, as well as boric acid or an equivalent borate, or sulphamic acid or an equivalent suplhamate.

The composition advantageously has a pH of the order of 7 to 8, especially 7.2 to 7.6.

It is in the form of an emulsion. The quantity of emulsifier which is employed depends on its nature and is easily determined by a person skilled in the art. To give an indication, this quantity may be from 1 to 10 parts by weight of emulsifier per 100 parts by weight of solids content in the resole.

As in the preceding variants, such a composition is stable and keeps a dilutability at 20° C. of at least 1000% after 3 weeks' storage a 12° C.

In another embodiment the resole is not neutralized just after its preparation. This is because, as it is sought to reach a degree of condensation which is as high as possible, in order to limit the emission of pollutants, there is no absolute need to deactivate the basic catalyst rapidly. In this embodiment the resin composition according to the invention contains an unneutralized phenol-formaldehyde-urea resole. The pH of such a composition is generally of the order of 8.5 to 10.

A particular subject-matter of the invention thus is a resin composition containing an overcondensed resole whose dilutability at pH 9 is lower than or equal to 2000%, especially of the order 1000 to 2000%, in an unneutralized form, for extemporaneous mixing with a neutralizing reactant.

This composition is stable in storage and can be employed as a premix which can be completed at the last moment on the site of use by extemporaneous mixing with the ingredients necessary for the sizing formulation.

Among these ingredients, a neutralizing reactant will be added in particular because of course, it is always desirable when the objective is to avoid pollution that the resin should be in neutralized form at the time of the application of the sizing and/or of the passage in an oven.

This neutralizing reactant may be chosen advantageously from boric acid or an equivalent borate, sulphamic acid or an equivalent sulphamate, and a system including an emulsifier and an acid, as described above.

As an alternative, the resin composition according to the invention may contain an acid-precursor neutralizing reactant acting with a delay, especially under heat activation. Thus, for example, ammonium sulphate or aluminum sulphate, added to the resin composition at ambient temperature does not modify the pH of the latter, but releases sulphuric acid at elevated temperature. The quantity of ammonium sulphate in the composition is determined so as to introduce a sufficient quantity of $H_2SO_4$ equivalents to neutralize the basic catalyst present in the resole.

In the particular case where the phenol-formaldehyde-urea resole is sprayable in the unneutralized state, especially with a dilutability at pH 9 of the order of approximately from 1000 to 2000%, or even less, but more generally approximately from 1500 to 2000%, the neutralizing reactant may be added at the spraying stage, in the form of a jet of aqueous solution or dispersion sprayed at the sizing crown ring. The use of an acid-precursor neutralizing reactant capable of acting with a delay, especially under heat activation, also lends itself to this alternative form, it being possible for the heat activation to take place, for example, when the sizing composition is applied to the hot filaments of mineral material or when the mat passes through the oven.

A subject-matter of the invention is therefore a process for manufacturing a mineral wool-based product, wherein mineral wool is produced, a sizing composition is sprayed onto the wool, the sized wool is collected as a mat, and the mat is subjected to a heat treatment, characterized in that the sizing composition comprises a resin composition including a heat activation neutralizing reactant.

Another subject-matter of the invention is a process for manufacturing a mineral wool-based product, wherein mineral wool is produced, a sizing composition is sprayed onto the wool, the sized wool is collected as a mat, and the mat is subjected to a heat treatment, characterized in that the sizing composition comprises a resin composition including an unneutralized resole and a heat activation neutralizing reactant is further sprayed onto the wool.

Another subject-matter of the invention is a process for the preparation of a resin composition such as above. This process includes a characteristic stage of overcondensation, consisting in reacting phenol, formaldehyde and optionally urea in basic medium until the product has a water dilutability at pH 9 lower than or equal to 2000%, especially 1500%, or even 1000%, followed by a neutralization stage.

The initial pH (before neutralization) of the resole obtained in basic medium is generally of the order of 8.5 to 10, especially from 9 to 9.5.

In the overcondensation stage phenol and formaldehyde are reacted in the presence of a basic catalyst, the formaldehyde/phenol ratio being of the order of 2 to 5, preferably from 2.5 to 4, especially from 2.8 to 3.6. The basic catalyst known per se, especially sodium hydroxide, potassium hydroxide, calcium hydroxide or barium hydroxide, or an amine catalyst, is in general employed in a quantity corresponding to 6 to 20 moles of OH hydroxyl equivalents per 100 moles of initial phenol.

This reaction is advantageously conducted until a degree of conversion of phenol is obtained which is equal to or higher than 98%, preferably 99%, very particularly of the order of at least 99.3 to 99.5%.

In a first alternative form the monomers are brought into contact with a basic polymerization catalyst preferably at a temperature of approximately between 20 and 60° C., and are taken to a reaction temperature of approximately between 50 and 80° C., preferably approximately 70° C., up to the desired degree of conversion. This reaction temperature is maintained advantageously for 100 to 200 minutes, preferably approximately from 130 to 160 minutes. This prolonged heating allows the overcondensation of the resin to be reached with formation of species of high molecular weight containing a higher proportion of large oligomers containing three or more intercondensed phenolic nuclei. The mixture is then cooled to a temperature of 20 to 30° C.

In a second alternative form the monomers are brought into contact with a basic polymerization catalyst preferably at a temperature of approximately between 20 and 60° C., and are taken to a first reaction temperature of approximately between 50 and 80° C., preferably of approximately 70° C., and then the temperature of the mixture is raised to a second reaction temperature of between 70 and 90° C., preferably 85° C., up to the desired degree of conversion. This second heating plateau is intended to produce an overcondensation of the resin with formation of high molecular weight species containing a higher proportion of large oligomers containing three or more intercondensed phenolic nuclei.

Advantageously, the reaction period at the first temperature is from 50 to 80 minutes and the reaction period at the second temperature is from 30 to 60 minutes. The mixture is then cooled to a temperature of 20 to 30° C.

In a general manner, one or more of the condensation monomers may also be fed continuously into the reaction mixture.

The preparation of the resin composition additionally includes modifying the product of phenol-formaldehyde condensation by reacting it with urea. In a first form of modification, urea is allowed to condense with the monomers in the hot reaction mixture. The urea is advantageously introduced into the reaction mixture during the cooling stage, especially as soon as the cooling begins. It may also be added after complete cooling of the reaction mixture, optionally after a certain period of storage at ambient or lower temperature. It may further be added, preferably cold, after the neutralization stage.

The neutralization stage may take place just after the overcondensation stage (the mixture being cold), or else after a stage of storage for a specified period following the overcondensation stage. It may in particular take place just before the formulation of the sizing.

It consists in adding an acid to the reaction mixture cooled to ambient temperature in sufficient quantity to lower the pH to a value of 7 to 8. The acid is advantageously introduced in a proportion of 0.88 to 0.92 mol of acid per mole of OH$^-$ hydroxyl equivalents introduced by the basic catalyst.

In the case of boric acid, the boric acid is preferably employed in aqueous solution preferably assaying for 3 to 20% by weight of boric acid. The solutions with a high boric acid assay generally contain a base, such as aqueous ammonia, intended to increase the solubility of the boric acid. The quantity of boric acid to be introduced is always calculated in order to neutralize the basic catalyst, but the final pH is then higher, of the order of 8.5 to 10.

In the case of sulphamic acid, the sulphamic acid is preferably employed in aqueous solution preferably assaying for 10 to 20% by weight of sulphamic acid or of a sulphamate. Sulphamic acid or sulphamate may also be used in the solid form to be solved into the resole.

At the end of the neutralization with boric acid, the resole is seen to have its water dilutability increased in relation to that in the initial basic medium. This advantageous effect is however not limited to neutralization of an overcondensed resole, but may be observed generally with any usual phenolic resin. If, with the latter, it is difficult to observe the increase in dilutability when treating the alkaline medium with the acid, because the initial dilutability is already high, neutralization with boric or sulphamic acid increases the stability of the resin with time. Where the resole is neutralized with one of those acids, the resin composition keeps a desired level of dilutability for a longer period of time than where the resole is neutralized with sulphuric acid.

In this respect another subject-matter of the invention is a process for improving the dilutability of a phenolic resole, especially with a water dilutability at pH 9 lower than or equal to 2000%, characterized in that it includes a stage consisting in neutralizing the resole with boric (or equivalent borate) or sulphamic acid (or equivalent sulphamate).

In another embodiment an acid and an emulsifier are added at the same time during the neutralization stage. Preferably, in the case of a common strong acid, the emulsifier is added first of all, especially in aqueous solution, and then the acid, so as to perform neutralization in the presence of the emulsifier.

In yet another embodiment the neutralization stage includes the mixing of the resole with a heat-activated neutralizing reactant, and heating the resulting mixture, it being possible for this heating to take place during the spraying on the hot glass filaments or the passage of the mat through the oven.

The dilutable and stable resin compositions according to the invention may be employed advantageously in a sizing composition for a mineral wool-based product which is not highly polluting and which additionally has a high sprayability.

Another subject-matter of the invention is a sizing composition for a mineral wool-based product, including a resin composition as described above, optionally additional urea and optionally sizing additives, the weight proportions of the resin and of the urea being preferably from 50:50 to 90:10.

In general, a typical sizing composition may include the following additives, per 100 parts by weight of solids content of resin and of urea:

| | |
|---|---|
| Ammonium sulphate | 0 to 5, advantageously 3 |
| Silane, especially aminosilane | 0 to 2 |
| Mineral oil | 0 to 20 |
| 20% strength aqueous ammonia | 0 to 20, advantageously 3 to 12 |

Ammonia may be added into the hot resin composition, or else cold as a premix after the condensation, or even when formulating the sizing, or at plural stages in the production of the composition.

Other advantages and special features of the invention will emerge from the following examples, no limitation being implied.

EXAMPLE 1

This example illustrates the neutralization of an overcondensed resole with boric acid.

Into a stirred reactor heated to 45° C. are introduced 66.2 kg of phenol (703 mol) and 159.7 kg of an aqueous solution containing 37% by weight of formaldehyde. This corresponds to a formaldehyde/phenol molecular ratio=2.8.

While the temperature is maintained at 45° C., 7.03 kg of sodium hydroxide in solution at a concentration of 47% (that is 82.6 mol of NaOH) are added over 30 minutes, portionwise.

At the end of the addition of sodium hydroxide the temperature of the mixture is raised to 70° C. over 30 minutes. Stirring is maintained at this temperature for 60 minutes.

The temperature of the mixture is then raised to 85° C. over 15 minutes and this temperature is maintained for 45 minutes. This second heating plateau is intended to produce an overcondensation of the resin with formation of species of high molecular weight containing a higher proportion of large oligomers containing three or more intercondensed phenolic nuclei. The degree of conversion of the phenol at the end of this overcondensation is 99.3%.

Cooling of the reactor is then commenced and at the same time 24.6 kg of granular urea are added over a period of 20 minutes. The temperature is then 60° C. and the cooling is continued for 40 minutes down to 25° C.

The resole obtained has a pH of 9.2 and a water dilutability at this pH of 800%.

The resole is then neutralized with 154 kg of a solution of boric acid at a concentration of 3% in water (that is 74.8 mol of $H_3BO_3$).

A resole of pH 7.2 is finally obtained, with a solids content of 30.4% by weight, containing less than 0.5% by weight of free formalin by weight relative to the total weight of modified resole, and 0.1% of free phenol. Its dilutability is higher than 2000% and remains such after 3 weeks' storage at 12° C.

In comparison, the same resole modified with urea but neutralized with 25% sulphuric acid precipitates when the pH becomes lower than 8.6.

EXAMPLE 2

In this example a still more condensed phenolic resole is prepared by pushing further the second heating stage.

Into the same type of stirred reactor heated to 45° C. are introduced 54.07 kg of phenol (575 mol) and 162.85 kg of an aqueous solution containing 37% by weight of formaldehyde. This corresponds to a formaldehyde/phenol molecular ratio=3.5.

While the temperature is maintained at 45° C., 5.76 kg of sodium hydroxide in solution at a concentration of 47% (that is 67.7 mol of NaOH) are added over 30 minutes, portionwise.

At the end of the addition of sodium hydroxide the temperature of the mixture is raised to 70° C. over 30 minutes. Stirring is maintained at this temperature for 60 minutes.

The temperature of the mixture is then raised to 85° C. over 15 minutes and this temperature is maintained for 50 minutes. The degree of conversion of the phenol at the end of this overcondensation is 99.63%.

Cooling of the reactor is then commenced and at the same time 54.1 kg of granular urea are added over a period of 20 minutes. The temperature is then 60° C. and the cooling is continued over 40 minutes down to 25° C.

The resole obtained has a pH of 9.3 and a water dilutability at this pH of 700%.

The resole is then neutralized with 123.5 kg of a solution of boric acid at a concentration of 3% in water (that is 59.9 mol of $H_3BO_3$).

A resole of pH 7.2 is finally obtained, with a solids content of 34.3% by weight, containing less than 0.5% by weight of free formalin by weight relative to the total weight of modified resol, and 0.05% of free phenol. Its dilutability is higher than 2000% and remains such after 3 weeks' storage at 12° C.

In comparison, the same resole modified with urea but neutralized with 25% sulphuric acid precipitates when the pH becomes lower than 8.6.

EXAMPLE 3

In this example the degree of condensation of the resin is increased by carrying out a prolonged heating of the monomers at only one temperature.

Into a stirred reactor heated to 450° C. are introduced 42.37 kg of phenol (451 mol) and 127.29 kg of an aqueous solution containing 37% by weight of formaldehyde. This corresponds to a formaldehyde/phenol molecular ratio=3.5.

While the temperature is maintained at 45° C. 5.35 kg of sodium hydroxide in solution at a concentration of 47% (that is 62.8 mol of NaOH) are added over 30 minutes, portionwise.

At the end of the addition of sodium hydroxide the temperature of the mixture is raised to 70° C. over 30 minutes. Stirring is maintained at this temperature for 140 minutes.

The degree of conversion of the phenol at the end of this overcondensation is 99.44%.

Cooling of the reactor is then commenced and at the same time 44 kg of granular urea are added over a period of 25 minutes. The temperature is then 45° C. and the cooling is continued over 15 minutes down to 30° C.

The resole obtained has a pH of 9.3 and a water dilutability at this pH of 2000%.

The resole is then neutralized at 30° C. with 17.65 kg of a solution of boric acid at a concentration of 20% in ammoniacal medium, prepared by adding 3.53 kg of pure boric acid to 11.76 kg of water at 20° C. and then adding, in small portions, 2.36 kg of 17% strength aqueous ammonia solution. The quantity of $H_3BO3$ introduced is therefore 57.1 mol, corresponding to the quantity necessary for neutralizing the same quantity of initial sodium hydroxide while bringing the pH to 7.2 (without addition of aqueous ammonia).

The material is then cooled to 25° C. over 15 minutes.

A resole of pH 8.7 is finally obtained, with a solids content of 46.4% by weight, containing less than 0.5% by weight of free formalin by weight relative to the total weight of modified resol, and 0.1% of free phenol. Its dilutability is higher than 2000% and remains higher than 1000% after 3 weeks' storage at 12° C.

In comparison, the same resole modified with urea but neutralized with 25% sulphuric acid has a very low dilutability lower than 500%.

EXAMPLES OF APPLICATION

The resoles of Examples 1 to 3 are employed to prepare sizing compositions by dilution with 6 volumes of water and optional addition of silane and of an oil. The sizing compositions are employed for manufacturing glass wool mats in conditions that are known to a person skilled in the art. The sizing is sprayed onto the hot glass filaments in a proportion of 4% by weight of sizing relative to the weight of glass, and the sheet collected on a receiver belt is passed through an oven at 280° C. The cumulative pollutant emissions are measured at the device for receiving the sized wool and at the oven by taking samples of the corresponding atmospheres by means of bubblers. The phenol content of the sample is measured by gas phase chromatography; the total phenol (all volatile phenolic derivatives), formaldehyde and aqueous ammonia content is measured by colorimetry, and the content of volatile organic compounds is measured by means of a TOCmeter. The results, expressed in kg of pollutant per ton of glass, are listed in Table 1 below.

COMPARATIVE EXAMPLE 1

Also shown in this table, for comparison, are the emissions of pollutants with a resin of the prior art of the phenol-formaldehyde-urea type which has a formaldehyde/phenol ratio $\geq 4$ and a free phenol content of 0.15%. At the end of preparation the urea-modified resin has a dilutability at pH 9 higher than 2000%. The sizing is prepared and applied as in the examples of application according to the invention.

TABLE 1

|  | EX. 1 | EX. 2 | EX. 3 | COMP. EX. 1 |
|---|---|---|---|---|
| Free phenol | 0.21 | 0.04 | 0.14 | 0.15 |
| Total phenol | 0.56 | 0.23 | 0.45 | 0.82 |
| Formaldehyde | 0.71 | 0.97 | 0.76 | 0.81 |
| Aqueous ammonia | 0.88 | 1.52 | 1.77 | 1.8 |
| All volatile organic compounds | 2.34 | 2.45 | 2.65 | 3.58 |

With the resoles of Examples 1 to 3 the total emission of volatile organic compounds is reduced by approximately 30% in relation to the resin of the prior art. A remarkable reduction is noted in particular in the emission of volatile phenolic derivatives (in particular phenol and monomethylol-phenols), and also of formaldehyde, as well as of aqueous ammonia.

COMPARATIVE EXAMPLE 2

In view of a comparison, Example 1 of document EP-A-148 050 has been reproduced, in which the condensation of the monomers does not reach the overcondensation level.

Formaldehyde in an aqueous solution at a concentration of 37% is thus reacted with phenol in a molecular ratio of 3.5 at a temperature of 45° C. under stirring. Sodium hydroxide in aqueous solution of 50% is added regularly over 30 minutes, at 45° C., so as to achieve to 6% by weight of the initial phenol, then the temperature is raised regularly from 45 to 70° C. over 30 minutes, and maintained at 70 ° C. for 71 minutes.

While cooling the mixture regularly from 70 to 50° C. over 20 minutes, urea is added in a molecular ratio to phenol of 1.18.

The resole is then neutralized with sulphuric acid until a pH of about 7.5 is obtained. The dilutability of the thus neutralized resole is 2000%, which shows the resin is far from being an overcondensed one.

Following table 2 shows how the dilutability of this composition sinks after 2 weeks' storage.

TABLE 2

| Time of storage at 120° C (days) | COMP. EX. 2 | EX. 3 neutralization with boric acid | Resin of EX. 3 neutralized with sulphuric acid |
|---|---|---|---|
| 0 | 2000% | 2000% | 300% |
| 4 | 2000% | 2000% | 200% |
| 8 | 1700% | 1800% | 100% |
| 12 | 1400% | 1700% | — |
| 18 | 100% | 1550% | — |

EXAMPLE 4

This example illustrates the neutralization of an overcondensed resole with sulphamic acid.

Into a stirred reactor heated to 45° C. are introduced 193 kg of phenol and 531 kg of an aqueous solution containing 37% by weight of formaldehyde. This corresponds to a formaldehyde/phenol molecular ratio=2.5.

While the temperature is maintained at 45° C. 24.2 kg of sodium hydroxide in solution at a concentration of 48% are added over 30 minutes, portionwise.

At the end of the addition of sodium hydroxide the temperature of the mixture is raised to 70° C. over 30 minutes. Stirring is maintained at this temperature for 150 minutes.

After cooling down to 25° C., the resole obtained has a pH of 9.1 and a water dilutability at this pH of 2000% .

The resin is neutralized by reacting with 177 kg of an aqueous solution of 15% sulphamic acid. Immediately after the end of the addition of sulphamic acid, the dilutability at 20° C. of the neutralized resole is only 600%, but rises above 1000% after 24 hours at room temperature. It might be that within those first 24 hours, the sulphamic acid keeps reacting with the resole.

A resole of pH 7.2 is finally obtained, with a solids content of 37.4% by weight, containing 4% by weight of free formalin relative to the total weight of the (not yet modified) resole, and 0.18% by weight of free phenol. Its dilutability remains higher than 1000% after 3 weeks' storage at 12 ° C.

From this resole, it is possible to prepare according to the needs a composition which is usable as a premix for the formulation of a sizing composition. Such preparation preferably takes place about 24 hours before the formulation of the sizing composition for immediate use of the latter.

This premix is prepared at room temperature by adding 40 parts by weight of urea to 60 parts by weight of neutralized resole. Following to this cold modification with urea, the resin composition contains less than 0.5% by weight of free formalin.

The premix is used for preparing a sizing composition of the following formula:

| premix | 100 parts by weight |
|---|---|
| ammonium sulphate | 1 |
| ammonia | 3 |

The cumulative pollutant emissions are measured, in the conditions set out in the foregoing Examples of Application, along the manufacture line of glass wool mats (expressed in kg of pollutant per ton of glass)

| | |
|---|---|
| free phenol | 0.19 |
| total phenol | 0.86 |
| formaldehyde | 0.47 |
| aqueous ammonia | 1.9 |
| All organic compounds | 2.35 |

This example shows that this resole generates emission of a greatly reduced amount of organic compounds in general.

EXAMPLE 5

This example illustrates the neutralization of an overcondensed resole with sulphuric acid in the presence of an emulsifier.

Into a stirred reactor heated to 45° C. are introduced 61.9 kg of phenol (658 mol) and 149.6 kg of an aqueous solution containing 37% by weight of formaldehyde. This corresponds to a formaldehyde/phenol molecular ratio=2.8.

While the temperature is maintained at 45° C. 6.5 kg of sodium hydroxide in solution at a concentration of 47% (that is 76.4 mol of NaOH) are added over 30 minutes, portionwise.

At the end of the addition of sodium hydroxide the temperature of the mixture is raised to 70° C. over 30 minutes. Stirring is maintained at this temperature for 60 minutes.

The temperature of the mixture is then increased to 85° C. over 15 minutes and this temperature is maintained for 45 minutes. The degree of conversion of the phenol at the end of this overcondensation is 99.3%.

Cooling of the reactor is then commenced and at the same time 16.3 kg of granular urea are added over a period of 30 minutes. The temperature is then 60° C. and the cooling is continued over 40 minutes down to 25° C.

The resole obtained has a pH of 9.3 and a water dilutability at this pH of 800% (solids content: 46.8%).

150 kg of a solution containing 2.6% of gums in water are added with stirring (1.3 kg of guar gum+2.6 kg of ghatti gum, diluted by sprinkling into the quantity of water necessary to obtain 2.6% solids content).

The resin is neutralized to pH 7.2 by addition of 25% sulphuric acid, with continued stirring.

A stable emulsion is formed in situ, whose dilutability is of at least 1000% for 3 weeks.

EXAMPLE 6

This example illustrates the use of a heat-activable neutralizing reactant with delayed action.

The procedure is as in Example 3, to prepare the phenol-formaldehyde-urea resole of 2000% dilut-ability at pH 9.3 (solids content: 46.4%). This basic resole is stored at 12° C. for a period which can range up to 15 days.

To bring this resole to pH 7.2 it would be necessary to add 11.2 kg of 25% sulphuric acid (that is 2.8 kg of $H_2SO_4$ or 28.5 mol).

Just before the manufacture of the sizing, the quantity of ammonium sulphate equivalent to sulphuric acid is added (28.5 mol, that is 3.76 kg of $(NH_4)_2SO_4$, for example 18.8 kg of 20% ammonium sulphate solution).

The solution obtained is sprayed immediately, together with the water for dilution.

When it is exposed to the high temperatures of the glass filaments, on the one hand, and the oven, on the other hand, the solution is the site of a reaction in which 1 mol of ammonium sulphate generates 1 mol of sulphuric acid and 2 mol of aqueous ammonia. The sulphuric acid released neutralizes the resole in situ on the glass filaments.

What is claimed is:

1. Resin composition comprising a urea-modified phenol-formaldehyde resole which has a formaldehyde/phenol ratio of 2 to 5, exhibiting a free formaldehyde content lower than or equal to 3% (by weight relative to the total weight of the composition), a free phenol content lower than or equal to 0.5% and a dilutability measured at 20° C. of at least 1000%, wherein said resole comprises (a) an overcondensed resole obtained by condensation of phenol, of formaldehyde and optionally of urea in basic medium until the product has a water dilutability measured at 20° C. and at pH 9 lower than or equal to 2000%, or (b) a product obtained by neutralization of the overcondensed resole (a).

2. Composition according to claim 1, wherein its dilutability at 20° C. remains at least 1000% after 3 weeks' storage at 12° C.

3. Composition according to claim 1, wherein the overcondensed resole is obtained by condensation of phenol, of formaldehyde and optionally of urea until the product has a water dilutability at pH 9 lower than or equal to 1500%.

4. Composition according to claim 3, wherein the water dilutability at pH 9 is lower than or equal to 1000%.

5. Composition according to claim 1, which has a free phenol content lower than or equal to 0.2%.

6. Composition according to claim 5, wherein the free phenol content is lower than or equal to 0.1%.

7. Composition according to claim 1, which contains product (b), and which is obtained by neutralization of overcondensed resole (a) with boric acid or an equivalent borate.

8. Composition according to claim 7, which has a pH of 7 to 10.

9. Composition according to claim 1, which contains product (b), and which is obtained by neutralization of overcondensed resole (a) with sulphamic acid or an equivalent sulphamate.

10. Composition according to claim 1, which contains product (b), and which is obtained by neutralization of overcondensed resole (a) in the presence of an emulsifier.

11. Composition according to claim 1, which contains overcondensed resole (a) and ammonium sulphate.

12. Process for the preparation of a resin composition according to claim 1, which includes an overcondensation stage comprising reacting phenol, formaldehyde and optionally urea in basic medium until the product has a water dilutability measured at 20° C. and at pH 9 lower than or equal to 2000%, followed by a neutralization stage, and a stage of modification with urea either before or after the neutralization stage but after the overcondensation stage.

13. Process according to claim 12, wherein the water dilutability at pH 9 is lower than or equal to 1500%.

14. Process according to claim 13, wherein the water dilutability at pH 9 is lower than or equal to 1000%.

15. Process according to claim 12, wherein the initial pH of the resole obtained in basic medium is of the order of 8.5 to 10.

16. Process according to claim 12, wherein, in the overcondensation stage, the phenol and the formaldehyde are reacted in the presence of a basic catalyst in a formaldehyde/phenol molar ratio of 2.5 to 4.

17. Process according to claim 12, wherein the overcondensation is conducted until a degree of conversion of phenol is obtained which is equal to or higher than 98%.

18. Process according to claim 17, wherein the degree of conversion of phenol is equal to or higher than 99%.

19. Process according to claim 18, wherein the degree of conversion of phenol is of the order of at least 99.3%.

20. Process according to claim 12, wherein the phenol and the formaldehyde are brought into contact with a basic polymerization catalyst at a temperature of between approximately 20 and 60° C. and are reacted at a reaction temperature of between approximately 50 and 80° C., up to the desired degree of conversion.

21. Process according to claim 20, wherein the reaction temperature is approximately 70° C.

22. Process according to claim 20, wherein the duration of said reaction is from 100 to 200 minutes.

23. Process according to claim 21, wherein the duration of said reaction is from 100 to 200 minutes.

24. Process according to claim 12, wherein the phenol and the formaldehyde are brought into contact with a basic polymerization catalyst at a temperature of between approximately 20 and 60° C. and are taken to a first reaction temperature of between approximately 50 and 80° C., and then the temperature of the mixture is raised to a second reaction temperature of between 70 and 90° C., up to the desired degree of conversion.

25. Process according to claim 24, wherein the first reaction temperature is approximately 70° C. and the second reaction temperature is approximately 85° C.

26. Process according to claim 24, wherein the reaction period at the first temperature is from 50 to 80 minutes and the reaction period at the second temperature is from 30 to 60 minutes.

27. Process according to claim 25, wherein the reaction period at the first temperature is from 50 to 80 minutes and the reaction period at the second temperature is from 30 to 60 minutes.

28. Process according to claim 12, wherein at the neutralization stage, acid is added in sufficient quantity to lower the pH to a value of 7 to 8.

29. Process according to claim 28, wherein the acid is introduced in a proportion of 0.88 to 0.92 mol of acid per mole of $OH^{31}$ hydroxyl equivalents introduced by a basic polymerization catalyst.

30. Process according to claim 29, wherein the neutralization stage employs boric acid or an equivalent borate, or sulphamic acid or an equivalent sulphamate, in aqueous solution to which a base has optionally been added.

31. Process according to claim 30, wherein, at the neutralization stage, an emulsifier is added.

32. Process according to claim 31, wherein the emulsifier is added before the acid.

33. Process according to claim 12, which includes an intermediate stage of storage of the product of overcondensation in basic medium, before the neutralization stage.

34. Process according to claim 12, wherein the neutralization stage includes the mixing of the product of overcondensation with a heat-activatable neutralizing reactant, and the heating of the resulting mixture.

35. Sizing composition for a mineral wool-based product comprising the resin composition according to claim 1, and optionally containing additional urea and/or sizing additives.

36. Process for manufacturing a mineral wool-based product, wherein mineral wool is produced, a sizing composition is sprayed onto the wool, the sized wool is collected as a mat, and the mat is subjected to a heat treatment, wherein the sizing composition comprises a resin composition according to claim 11.

37. Process for manufacturing a mineral wool-based product, wherein mineral wool is produced, a sizing composition is sprayed onto the wool, the sized wool is collected as a mat, and the mat is subjected to a heat treatment, wherein the sizing composition comprises a resin composition according to claim 10, and in that a heat activation neutralizing reactant is further sprayed onto the wool.

38. Resin composition comprising a urea-modified phenol-formaldehyde resole which has a formaldehyde/phenol ratio of 2 to 5, exhibiting a free formaldehyde content lower than or equal to 3% (by weight relative to the total weight of the composition), a free phenol content lower than or equal to 0.5%, wherein said resole comprises (a) an overcondensed resole which has a water dilutability measured at 20° C. and at pH 9 lower than or equal to 2000%, not neutralized for extemporaneous mixing with a neutralizing reactant.

39. Process for improving the dilutability of an overcondensed phenolic resole, comprising neutralizing the resole with boric acid or an equivalent borate, or with sulphamic acid or an equivalent sulphamate.

40. Process according to claim 38, wherein the overcondensed phenolic resole is a resole of water dilutability measured at 20° C. and at pH 9 lower than or equal to 2000%.

41. Resin composition comprising a urea-modified phenol-formaldehyde resole which has a formaldehyde/phenol ratio of 2 to 5, exhibiting a free formaldehyde content lower than or equal to 3% (by weight relative to the total weight of the composition), a free phenol content lower than or equal to 0.5% and a dilutability measured at 20° C. of at least 1000%, wherein said resole comprises (a) an overcondensed resole obtained by condensation of phenol, of formaldehyde and optionally of urea in basic medium until the product has a water dilutability measured at 20° C. and at pH 9 between 1000 and 2000%.

42. Composition according to claim 41, wherein its dilutability at 20° C. remains at least 1000% after 3 weeks' storage at 12° C.

43. Composition according to claim 41, wherein the overcondensed resole is obtained by condensation of phenol, of formaldehyde and optionally of urea until the product has a water dilutability at pH 9 lower than or equal to 1500%.

44. Composition according to claim 43, wherein the water dilutability at pH 9 is lower than or equal to 1000%.

45. Composition according to claim 41, which contains overcondensed resole (a) and ammonium sulphate.

46. Resin composition comprising a neutralized urea-modified phenol-formaldehyde resole which has a formaldehyde/phenol ratio of 2 to 5, exhibiting a free formaldehyde content lower than or equal to 3% (by weight relative to the total weight of the composition), a free phenol content lower than or equal to 0.5% and a dilutability measured at 20° C. of at least 1000%, wherein said neutralized resole comprises (a) a product obtained by neutralization of an overcondensed resole obtained by condensation of phenol, of formaldehyde and optionally of urea in basic medium until the product has a water dilutability measured at 20° C. and at pH 9 lower than or equal to 2000%.

47. Composition according to claim 46, wherein its dilutability at 20° C. remains at least 1000% after 3 weeks' storage at 12° C.

48. Composition according to claim 46, wherein the overcondensed resole is obtained by condensation of phenol, of formaldehyde and optionally of urea until the product has a water dilutability at pH 9 lower than or equal to 1500%.

49. Composition according to claim 48, wherein the water dilutability at pH 9 is lower than or equal to 1000%.

50. Composition according to claim 46, which has a free phenol content lower than or equal to 0.2%.

51. Composition according to claim 50, wherein the free phenol content is lower than or equal to 0.1%.

52. Composition according to claim 46, wherein the product is obtained by neutralization of overcondensed resole (a) with boric acid or an equivalent borate.

53. Composition according to claim 52, which has a pH of 7 to 10.

54. Composition according to claim 46, wherein the product is obtained by neutralization of overcondensed resole (a) with sulphamic acid or an equivalent sulphamate.

55. Composition according to claim 46, wherein the product is obtained by neutralization of overcondensed resole (a) in the presence of an emulsifier.

* * * * *

UNITED STATES PATENT AND TRADEMARK OFFICE
CERTIFICATE OF CORRECTION

PATENT NO. : 6,342,271 B1
DATED : January 29, 2002
INVENTOR(S) : Lericque et al.

It is certified that error appears in the above-identified patent and that said Letters Patent is hereby corrected as shown below:

<u>Title page,</u>
Item [30], the Foreign Application Priority information should read:

-- [30]    Foreign Application Priority Data
      Jul. 15, 1997  (FR) ................................... 97-08936 --

Signed and Sealed this

Third Day of September, 2002

*Attest:*

*Attesting Officer*

JAMES E. ROGAN
*Director of the United States Patent and Trademark Office*